United States Patent [19]

Takahashi et al.

[11] Patent Number: 4,779,693

[45] Date of Patent: Oct. 25, 1988

[54] REAR WHEEL STEERING APPARATUS FOR AN AUTOMOBILE

[75] Inventors: Akira Takahashi; Toshihiro Konno, both of Ota; Mitsuharu Morishita, Himeji, all of Japan

[73] Assignees: Fuji Jukogyo Kabushiki Kaisha; Mitsubishi Danki Kabushiki Kaisha, both of Japan

[21] Appl. No.: 120,954

[22] Filed: Nov. 16, 1987

[30] Foreign Application Priority Data

Nov. 15, 1986 [JP] Japan .................. 61-272294

[51] Int. Cl.$^4$ ............................................. B62D 6/02
[52] U.S. Cl. ...................................... 180/140; 280/91
[58] Field of Search .................. 280/91; 180/140, 141, 180/142

[56] References Cited

FOREIGN PATENT DOCUMENTS

0243180 10/1987 European Pat. Off. ............ 180/140
175178 8/1986 Japan .................................. 180/140

Primary Examiner—John J. Love
Assistant Examiner—Karin L. Ferriter
Attorney, Agent, or Firm—Wenderoth, Lind and Ponack

[57] ABSTRACT

A rear wheel steering apparatus for a vehicle with hydraulic power steering for the front wheels is disclosed. Pressure sensors detect the hydraulic pressure in the two chambers of a power cylinder for the front wheels. A differential amplifier which is connected to the pressure sensors produces an output signal corresponding to the pressure difference between the chambers. An electric motor for steering the rear wheels is controlled by a control unit in response to the output signal from the differential amplifier and an output signal from a vehicle speed sensor. At high speeds, the rear wheels are steered in the same direction as the front wheels, and at low speeds, they are steered in the opposite direction. When the steering wheel is in a neutral position and a sudden lateral force acts on the vehicle to cause a cornering force to be exerted on the front wheels, the rear wheels are steered in the direction tending to increase the restoring moment acting on the vehicle.

4 Claims, 5 Drawing Sheets

REAR WHEEL STEERING APPARATUS FOR AN AUTOMOBILE

BACKGROUND OF THE INVENTION

This invention relates to a rear wheel steering apparatus for an automobile, and more particularly it relates to a rear wheel steering apparatus for an automobile having a hydraulic power steering mechanism for the front wheels.

In recent years, devices for steering not only the front wheels but also the rear wheels of automotive vehicles have been developed. In general, the direction in which the rear wheels is steered by such devices varies depending on the speed of the vehicle. At high speeds, the rear wheels are steered in the same direction as the front wheels, as a result of which the vehicle responds more quickly to changes in the direction of steering. At very low speeds, the rear wheels are steered in the opposite direction from the front wheels in order to reduce the turning radius of the vehicle, thereby making it easier to turn the vehicle around sharp corners and to park it.

Various types of rear wheel steering devices have been proposed. For example, U.S. Pat. No. 4,313,514 discloses a mechanical device for steering the rear wheels. The rotation of the steering wheel is transmitted to both the front and rear wheels by a mechanical linkage. The angle by which the rear wheels are steered is proportional to the angle by which the steering wheel is turned. An actuator controls the location of a pivot point in the linkage in accordance with the speed of the vehicle. At high speeds, the pivot point is positioned such that the front and rear wheels are steered in the same direction, and at low speeds. It is positioned such that the front and rear wheels are steered in opposite directions.

U.S. Pat. No. 4,586,581 discloses a rear wheel steering apparatus for a vehicle having a hydraulic power steering apparatus for the front wheels in which the rear wheels are steered by hydraulic actuators. The steering shaft contains two control valves disposed in series, one of which controls the flow of oil to a power cylinder for the front wheels, and the other of which controls the flow of oil to the hydraulic actuators for the rear wheels. The angle of steering of the rear wheels is controlled in accordance with the torque applied to the steering wheel.

There are a number of problems with these and other such conventional steering devices. When the rear wheels are steered in accordance with the angle of steering of the front wheels, a steering angle sensor must be provided. This is commonly in the form of a sensor which measures the rotational angle of the steering shaft or the linear movement of the rack of a rack and pinion steering gear. However, with this arrangement, there are problems with the steering shaft from the standpoint of space and problems with the rack from the standpoint of its surroundings.

On the other hand, if the rear wheels are steered in accordance with the torque applied to the steering wheel, a device for measuring the steering torque must be provided. A torque bar is generally used for this purpose. However, if the vehicle is equipped with hydraulic power steering for the front wheels, a torsion bar is already housed within a control valve in the steering shaft. If another torque bar in the form of a torsion bar is employed for use in steering the rear wheels, there end up being two torsion bars inserted in the steering shaft in series, resulting in an undersirable decrease in the stiffness of the steering shaft.

It is conceivable to employ the torsion bar of the control valve of the hydraulic power steering device for both the front wheels and the rear wheels. In this case, a torque sensor which outputs electrical signals to the control valve could be used. However, this arrangement has problems with respect to space and resistance to oil pressure of the torque sensor.

Figure 7A:
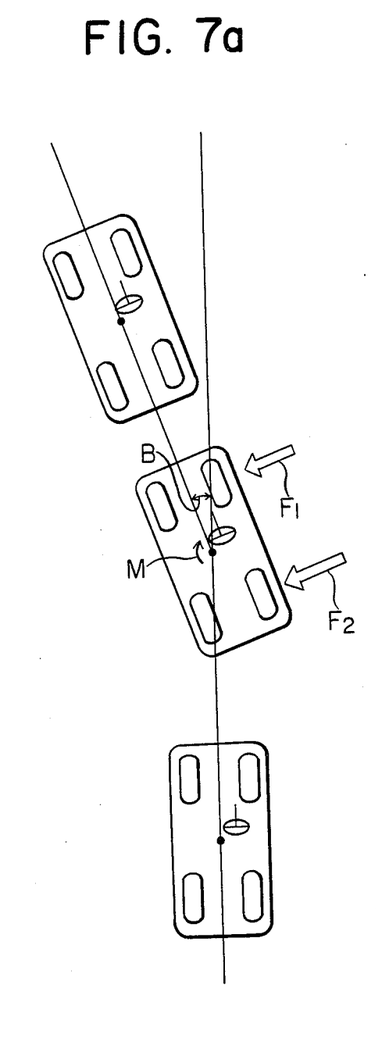
FIGS. 7a and 7b are schematic plan views each illustrating the motion of a vehicle when a sudden lateral force acts on it, FIG. 7a showing the case for a vehicle with a conventional rear wheel steering apparatus and FIG. 7b showing the case for a vehicle equipped with a rear wheel steering apparatus in accordance with the present invention.

There is the further problem that conventional rear wheel steering devices do not improve the directional stability of a vehicle. If a vehicle is travelling in a straight line, as shown in FIG. 7a, and is subjected to a sudden lateral force due to a gust of wind or the like, cornering forces F1 and F2 act on the front and rear wheels, respectively, and the vehicle veers from a straight course by an angle B. In a vehicle with a conventional rear wheel steering apparatus, if the steering wheel of the vehicle is maintained in a neutral position, both the front and rear wheels remain pointing straight ahead. Therefore, the restoring moment M which acts in the direction tending to return the vehicle to its original course is small and the vehicle continues to deviate from its original course, just as in a vehicle having unsteerable rear wheels.

SUMMARY OF THE INVENTION

It is therefore an object of the present invention to provide a rear wheel steering apparatus for an automotive vehicle having a front wheel hydraulic steering device which can increase the restoring moment of the vehicle when a lateral force is applied to it.

It is another object of the present invention to provide a rear wheel steering apparatus which does not require a torsion bar for the rear wheels to be implanted in the steering shaft of the vehicle.

The present invention resides in a rear wheel steering apparatus for a vehicle having a hydraulic power steering device for the front wheels of the vehicle. The hydraulic steering device has a power cylinder which is divided into two chambers by a piston. The piston is connected to the steering linkage of the front wheels such that when there is a pressure difference between the two chambers of the power cylinder, an auxiliary steering force is exerted on the steering linkage. The rear wheels are steered in accordance with the speed of the vehicle and the pressure difference between the two chambers of the power cylinder. As a pressure difference results either when the driver of the vehicle turns the steering wheel or when a cornering force acts on the front wheels, the rear wheels can be turned to counteract deviations in the course of the vehicle which produce cornering forces, even when no steering force is applied to the steering wheel.

A rear wheel steering apparatus in accordance with the present invention comprises means for detecting hydraulic pressure differences between the two chambers of the power cylinder and producing a corresponding output signal, means for measuring the speed of the vehicle and producing a corresponding output signal, steering means for steering the rear wheels, and control means for controlling the steering means in accordance with the output signals from the means for detecting hydraulic pressure differences and the means for measuring the vehicle speed. When there is a pressure difference in the power cylinder. at high vehicle speeds, the rear wheels are steered in the same direction as the front wheels would tend to be steered by the resulting auxiliary steering force. At low vehicle speeds, the rear wheels are steered in the opposite direction from the direction in which the front wheels would tend to be steered by the auxiliary steering force. At intermediate vehicle speeds, the rear wheels are maintained in a straight-ahead position.

In a preferred embodiment, the means for detecting pressure differences comprises a first pressure sensor which measures the hydraulic pressure in the first chamber of the power cylinder and produces a corresponding output signal, a second pressure sensor which measures the hydraulic pressure in the second chamber of the power cylinder and produces a corresponding output signal, and a differential amplifier into which the output signals from the pressure sensors are input and which produces an electrical output signal corresponding to the difference between the pressures measured by the two pressure sensors.

There is no restriction on the type of device used to steer the rear wheels, but in a preferred embodiment, the rear wheels are steered by an electric motor, a steering gear which converts the rotation of the electric motor into linear motion, and a steering linkage comprising tie rods and knuckle arms which are driven by the steering gear.

DESCRIPTION OF THE PREFERRED EMBODIMENTS

Figure 1:
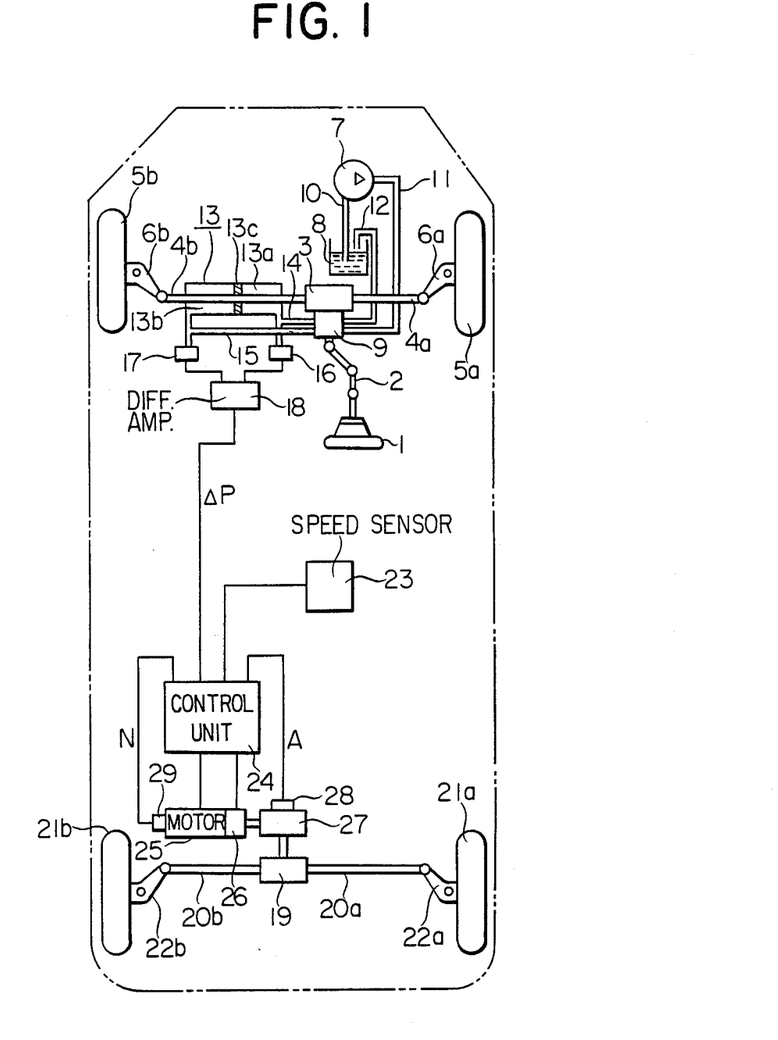
FIG. 1 is a schematic view of an automobile to which an embodiment of a rear wheel steering apparatus in accordance with the present invention is applied.

Hereinbelow, a preferred embodiment of a rear wheel steering apparatus in accordance with the present invention will be described while referring to the accompanying drawings. FIG. 1 of which is a schematic view of a vehicle to which this embodiment is applied. The vehicle is equipped with a conventional hydraulic power steering mechanism for the front wheels. The steering wheel 1 of the vehicle is connected to a front wheel steering gearbox 3 by a steering shaft 2. The gearbox 3 contains an unillustrated, conventional steering gear for converting the rotation of the steering shaft 2 into linear movement, such as a rack and pinion steering gear. A right tie rod 4a and a left tie rod 4b are moved in a straight line by the rack. The outer ends of the tie rods 4a and 4b are respectively connected to right and left knuckle arms 6a and 6b, which are respectively connected to right and left front wheels 5a and 5b in a conventional manner.

A hydraulic pump 7 is driven by the unillustrated engine of the vehicle. The input port of the pump 7 is connected to a reservoir 8 for power steering fluid by a first pipe 10. The discharge port of the pump 7 is connected to an inlet of a control valve 9 by a second pipe 11. A third pipe 12 which is connected to an outlet of the control valve 9 returns power steering fluid to the reservoir 8.

The control valve 9, which is opened and closed in accordance with the torque applied to the steering wheel 1, controls the supply of power steering fluid to a power cylinder 13 which produces an auxiliary force for steering the front wheels. The power cylinder 13 is divided into a right chamber 13a and a left chamber 13b by a piston 13c which is connected to the left tie rod 4b. The right and left chambers of the power cylinder 13 are connected to the control valve 9 by a fourth pipe 14 and a fifth pipe 15, respectively. Power steering fluid which is pumped by the hydraulic pump 7 can be introduced into either the right or left chamber via the fourth and fifth pipes.

A right hydraulic pressure sensor 16 and a left hydraulic pressure sensor 17 are disposed so as to detect the pressures in the right and left chambers, respectively, of the power cylinder 13. Each of the pressure sensors produces an electrical output signal which corresponds to the detected pressure and which is input to a differential amplifier 18. The differential amplifier 18 produces an electrical output signal which corresponds to the difference in the levels of the input signals from the pressure sensors and therefore to the difference in pressure between the right and left chambers of the power cylinder 13. The output signal from the differential amplifier 18 is input to a control unit 24. A speed sensor 23 which detects the speed of the vehicle produces an electrical output signal which corresponds to the speed and provides it as an input signal to the control unit 24.

The control unit 24 controls an electric motor 25 for steering the rear wheels of the vehicle. An electromagnetic brake 26 for braking the motor 25 is connected to the output shaft of the motor 25. The electromagnetic brake 26, which is also controlled by the control unit 24, is of the type which is released when a current is supplied thereto and which exerts a braking force when the supply of current to the brake 26 is stopped.

The output shaft of the motor 25 is connected to a reduction gear 27 comprising a worm and a worm wheel, for example. The output shaft of the reduction gear 27 is connected to a rear wheel steering gearbox 19. The gearbox 19 contains a steering gear such as a rack and pinion steering gear for converting the rotation of the output shaft of the reduction gear 27 into linear motion, which is transmitted to right and left tie rods 20a and 20b, respectively. The outer ends of the tie rods are connected to right and left rear wheels, 21a and 21b, through right and left knuckle arms 22a and 22b, respectively.

The angle of rotation of the output shaft of the reduction gear 27 is detected by an angle sensor 28 which is mounted on the gearbox 27. The angle sensor 28 produces an electrical output signal which corresponds to the detected angle and which is input to the control unit 24. A rotational speed sensor 29 which is mounted on the motor 25 detects the rotational speed of the motor 25 and produces a corresponding electrical output signal, which is also input to the control unit 24.

Based on the input signals from the differential amplifier 18 and the speed sensor 23, the control unit 24 calculates the direction in which and the angle by which the rear wheels should be steered, and it controls the motor 25 so as to achieve the calculated direction and angle of steering.

The operation of the illustrated embodiment is as follows. When the engine of the vehicle is started, the hydraulic pump 7 is driven and pumps power steering fluid from the reservoir 8 and circulates it through the second pipe 11, the control valve 9, and the third pipe 12 back to the reservoir 8. When the steering wheel 1 is turned to the right, the control valve 9 enables power steering fluid under pressure to flow into the right chamber 13a of the power cylinder 13, and the pressure acting on the piston 13c helps push the left tie rod 4b to the left, thereby reducing the steering torque which the driver must exert. On the other hand, when the steering wheel 1 is turned to the left, the control valve 9 enables power steering fluid to flow into the left chamber 13b of the power cylinder 13, and the pressure acting on the piston 13c helps push the left tie rod 4b to the right.

Figure 2:
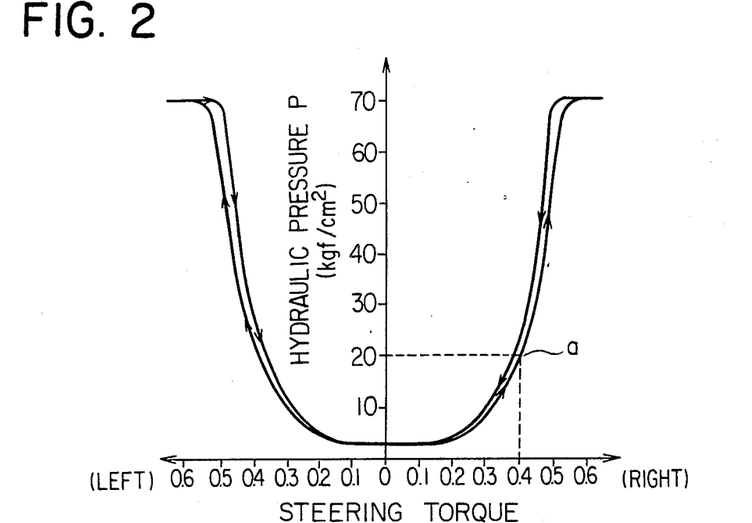
FIG. 2 is a graph of the hydraulic pressure produced in the right and left chambers of the power cylinder in FIG. 1 as a function of the torque applied to the steering wheel.

FIG. 2 is a graph of the hydraulic pressure in the right or left chamber of the power cylinder 13 as a function of steering torque when the steering wheel 1 is turned to the left or right, respectively. As can be seen from this graph, the hydraulic pressure increases parabolically with increasing steering torque, and there is a slight hysteresis in the relationship between pressure and steering torque as the steering torque rises and falls.

The pressure sensors 16 and 17 detect the pressures in the right and left chambers of the power cylinder 13 and produce corresponding output signals. The differential amplifier 18 produces an electrical output signal corresponding to the difference between the two input signals. Based on the electrical output signal from the differential amplifier 18 and the output signal from the speed sensor 23, the control unit 24 computes a target steering angle At for the rear wheels.

Figure 5:
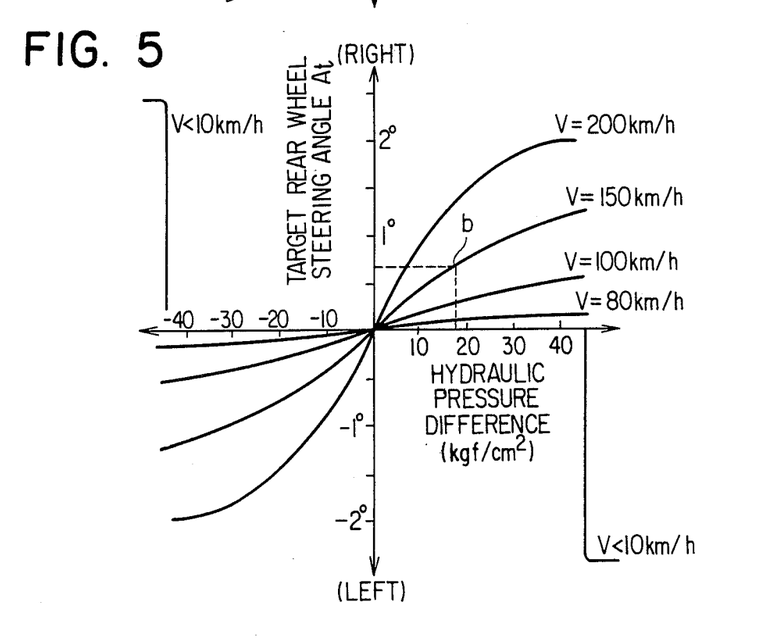
FIG. 5 is a graph of the target steering angle for the rear wheels as a function of the hydraulic pressure difference between the right and left chambers of the power cylinder for different vehicle speeds.
Figure 6:
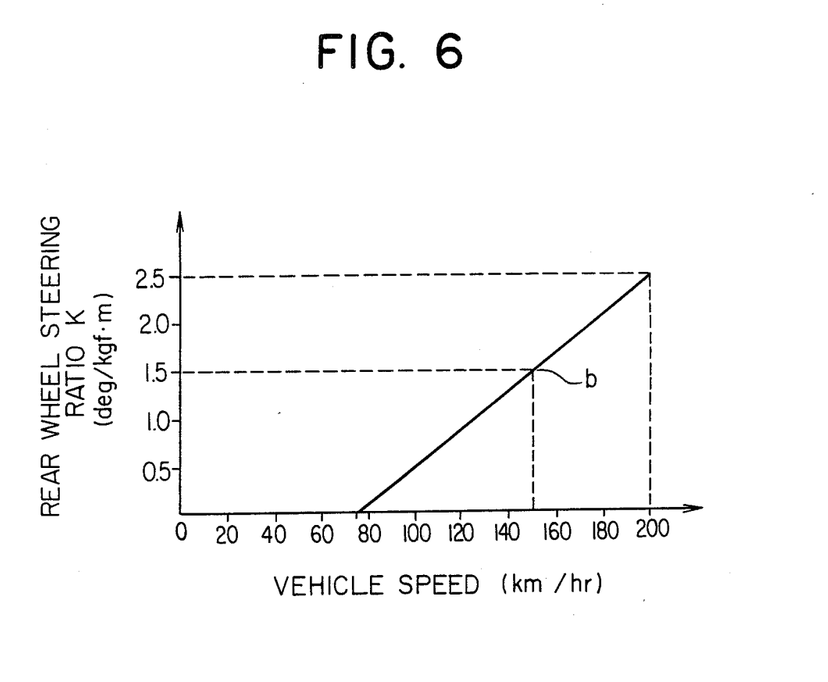
FIG. 6 is a graph of the rear wheel steering ratio as a function of vehicle speed.

The relationship between the target angle At and the pressure difference between the right and left chambers of the power cylinder 13 is illustrated in FIG. 5. The pressure difference equals the pressure in the right chamber 13a minus the pressure in the left chamber 13b, and a positive steering angle corresponds to rightwards steering of the rear wheels while a negative steering angle corresponds to leftwards steering. At a high vehicle speed of 75 km/hr and above, the target steering angle At increases continuously as the pressure difference increases and has the same sign as the steering angle for the front wheels, meaning that the front and rear wheels are steered in the same direction. At a low vehicle speed of less than 10 km/hr, when a prescribed pressure difference develops between the chambers of the power cylinder 13, the rear wheels are steered by the maximum amount (approximately 2.5 degrees) in the direction opposite to the front wheels. In an intermediate speed range of 10 to 75 km/hr, the rear wheels are not steered, regardless of the pressure difference.

The control unit 24 receives an input signal from the rotational angle sensor 28 corresponding to the present steering angle A of the rear wheels, and it determines the error $Ae(=At-A)$ between the target steering angle At and the present steering angle A.

The control unit 24 also computes a target rotational speed Nt for the motor 25, and determines the error $Ne(=Nt-N)$ between the target rotational speed Nt and the actual rotational speed N, which is indicated by the output signal from the rotational speed sensor 29.

Based on the steering angle error Ae and the rotational speed error Ne, the control unit 24 controls the direction and speed of rotation of the motor 25.

When the vehicle is moving with the steering wheel 1 in the neutral (straight ahead) position and no cornering force is acting on the front wheels, a hydraulic pressure of approximately 2-3 kgf/square cm will exist in both chambers of the power cylinder 13 due to the operation of the pump 7. As the output signals of the two pressure sensors 16 and 17 will be substantially equal, the output of the differential amplifier 18 will be substantially zero, and the target steering angle At calculated by the control unit 24 will be zero. If the rear wheels should deviate from a neutral position, the control unit 24 will drive the motor 25 to return the rear wheels to the neutral position.

Next the case will be described in which the vehicle is traveling at a high speed and a torque is applied to the steering wheel 1. If the vehicle speed is 150 km/hr and the driver applies a clockwise torque of 0.4 kgf×m to the steering wheel 1, a pressure difference between the two chambers of the power cylinder 13 will be produced. For a steering torque of 0.4 kgf×m, a pressure of approximately 20 kgf per square cm will develop in the right chamber 13a, as shown by point a in FIG. 2.

Figure 3:
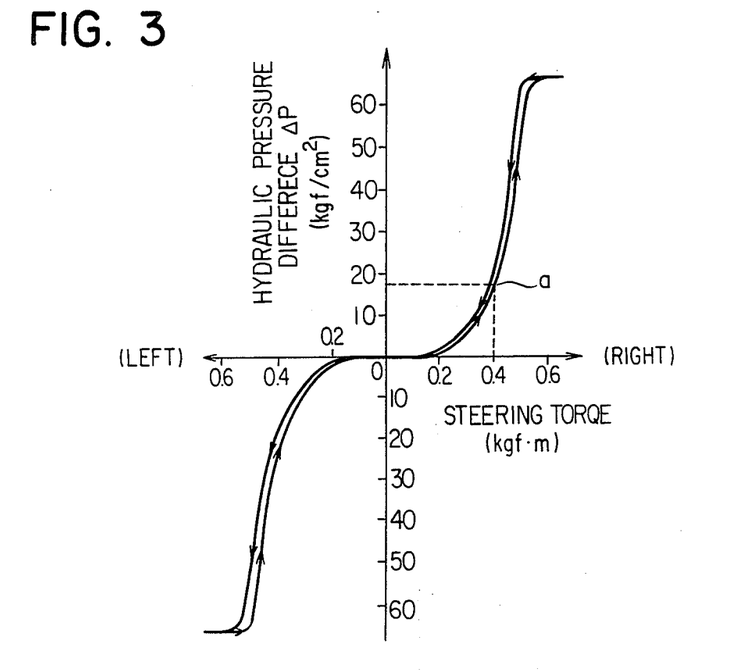
FIG. 3 is a graph of the difference in hydraulic pressure between the right and left chambers of the power cylinder of FIG. 1 as a function of the torque applied to the steering wheel.

However, there will still be a hydraulic pressure of 2-3 kg per square cm in the left chamber 13b, so the pressure difference between the two chambers of the power cylinder 13 will be approximately 17-18 kgf per square cm, as shown by point a of FIG. 3. The differential amplifier 18 will produce an output signal corresponding to this pressure difference.

Based on the detected pressure difference, the control unit 24 will calculate a target steering angle At. For a pressure difference of 17-18 kgf per square cm, the target steering angle At is approximately 0.7 degrees, as shown by point b of FIG. 5. If the present steering angle A of the rear wheels is 0 degrees, then the error Ae is equal to 0.7 degrees.

As 0.7 degrees is a large, positive value, the control unit 24 selects a high value of approximately 2000 rpm for the target rotational speed Nt of the motor 25. If the motor 25 is stationary, the error Ne between the target rotational speed Nt and the present rotational speed N is 2000 rpm, and the control unit 24 applies a full voltage to the motor 25 to make it steer the rear wheels to the right. When the rotational speed N of the motor 25 nears the target rotational speed Nt (when the error Ne becomes less than approximately 200 rpm), the rotational speed of the electric motor 25 is held constant by the control unit 24, and if the actual speed N exceeds the target rotational speed Nt by at least 200 rpm, the rotational speed of the electric motor 25 is reduced towards the target rotational speed Nt.

The rotation of the electric motor 25 is transmitted to the reduction gear 27 through the brake 26. The reduction gear 27 steers the rear wheels to the right through the steering gear within the steering gearbox 19 and the steering linkage comprising the tie rods 20a and 20b and the knuckle arms 22 and 22a.

The control unit 24 continuously calculates the error Ae between the actual steering angle A and the target steering angle At. As the error Ae decreases, the control unit 24 decreases the target rotational speed Nt. When the error Ae is near zero (less than or equal to approximately 0.05 degrees), the target rotational speed Nt is set to zero, and a halt command is issued to the electric motor 25.

When a counterclockwise torque is applied to the steering wheel 1 while the vehicle is running at a high speed, the rear wheels are steered to the left by a process similar to that described above for a clockwise steering torque.

When the vehicle is traveling at an extremely low speed of less than 10 km per hour, if the steering wheel is turned by the maximum amount in either direction, the unillustrated rack in the front steering gearbox 3 will hit a stopper, and the pressure difference between the two chambers of the power cylinder 13 will abruptly rise to a high value of approximately 50 kg per square cm. In this case, the control unit 24 will control the motor 25 so as to steer the rear wheels by a maximum angle (approximately 2.5 degrees) in the opposite direction from the front wheels. Steering the rear wheels in this manner will decrease the turning radius of the vehicle and increase its turning ability.

Figure 4:
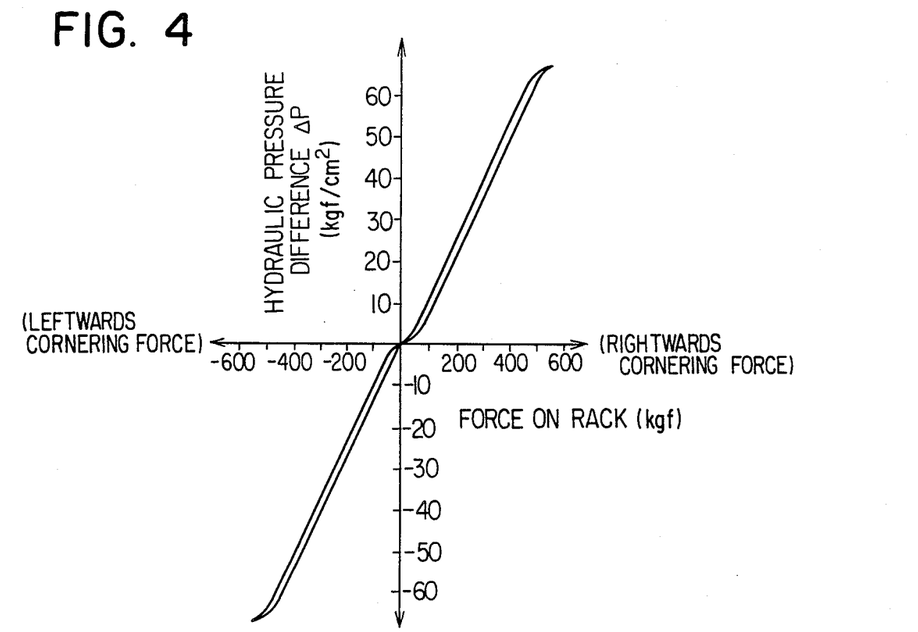
FIG. 4 is a graph of the difference in hydraulic pressure between the right and left chambers of the power cylinder of FIG. 1 as a function of the force acting on the rack of the front wheel steering gear.

When a cornering force acts on the front wheels, an axial force in the same direction as the cornering force is exerted on the rack of the front wheel steering gear. This force on the rack produces a pressure difference between the two chambers of the power cylinder 13, just as when a torque is applied to the steering wheel 1. The relationship between the force acting on the rack of the steering gear and the pressure difference in the power cylinder 13 is illustrated in FIG. 4. When the cornering force and the force on the rack are rightwards, the piston 13c is pushed rightwards. The pressure in the right chamber 13a of the power cylinder 13 is increased over that in the left chamber 13b, so a positive pressure difference is produced. When the cornering force and the force on the rack are leftwards, the pressure in the left chamber 13b is increased over that in the right chamber 13a, so a negative pressure difference is produced. The differential amplifier 18 produces an output signal corresponding to this pressure difference, and the control unit 24 controls the motor 25 so as to steer the rear wheels in the direction in which the cornering force on the front wheels acts.

Figure 7B:
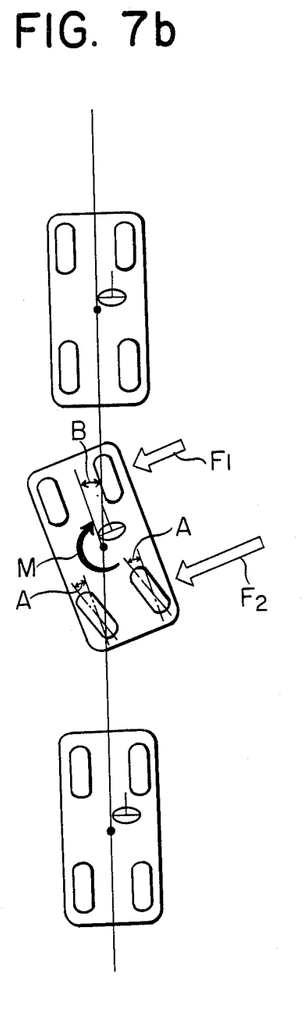

When the vehicle is traveling in a straight line with the steering wheel 1 in the neutral position and a sudden lateral force (such as a strong gust of wind) is exerted on the vehicle. the vehicle will be made to deviate from its original course by an angle B, as shown in FIG. 7b. As a result, cornering forces F1 and F2 corresponding to the angle of deviation B are exerted on the front and rear wheels, respectively. If all the wheels were maintained in a neutral position, only a small restoring moment M would act on the vehicle and it would continue to veer from its original course.

However, in a vehicle equipped with the present invention, the cornering force F1 acting on the front wheels produces a pressure difference in the power cylinder 13. Based on the pressure difference, the rear wheels are steered in the direction of the front wheel cornering force F1 by an angle A, as shown in FIG. 7b. Steering the rear wheels in the direction of the front wheel cornering force F1 increases the rear wheel cornering force F2, as a result of which a large restoring moment M is generated which returns the vehicle to its original course.

As can be seen from the above description, a rear wheel steering apparatus in accordance with the present invention increases the directional stability of a vehicle with respect to lateral forces. In addition, it does not require a torsion bar for use in steering the rear wheels, so it is not necessary to install two torsion bars in series in the steering shaft, and the stiffness of the steering shaft is not decreased. Furthermore, the present invention does not require a steering angle sensor for detecting the steering angle of the front wheels, so it can be more compact than conventional rear wheel steering apparatuses which employ a steering angle sensor.

What is claimed is:

1. A rear wheel steering apparatus for an automotive vehicle having front and rear wheels, comprising:
   a hydraulic power steering mechanism for steering the front wheels, said hydraulic power steering mechanism including a power cylinder having a first chamber and a second chamber which are separated by a piston, and means for supplying hydraulic fluid under pressure to said power cylinder, said piston being connected to a steering linkage for said front wheels in a manner such that when there is a difference in hydraulic pressure between said first and second chambers, an auxiliary steering force is produced;
   pressure difference detecting means for detecting the difference in hydraulic pressure between said first and second chambers of said power cylinder and producing a corresponding output signal;
   speed detecting means for detecting the speed of said vehicle and producing a corresponding output signal;
   steering means for steering said rear wheels; and
   control means for controlling said steering means based on the output signals from said pressure difference detecting means and said speed detecting means such that when there is a hydraulic pressure difference between said first and second chambers of said power cylinder, at high vehicle speeds said rear wheels are steered in the same direction as said front wheels would tend to be steered by the resulting auxiliary steering force, at low vehicle speeds said rear wheels are steered in the opposite direction from which said front wheels would tend to be steered by said auxiliary steering force, and at intermediate vehicle speeds said rear wheels are maintained in a straight-ahead position.

2. A rear wheel steering apparatus as claimed in claim 1, wherein said pressure difference detecting means comprises;
   first pressure detecting means for detecting the hydraulic pressure in said first chamber of said power cylinder and producing a corresponding output signal;
   second pressure detecting means for detecting the hydraulic pressure in said second chamber of said power cylinder and producing a corresponding output signal; and
   a differential amplifier into which the output signals of said first and second pressure detecting means are input, the output of said differential amplifier being input to said control means.

3. A rear wheel steering apparatus as claimed in claim 1, wherein said steering means comprises;
an electric motor;
a steering gear which is driven by said electric motor; and
a steering linkage which is connected between said rear wheels and said steering gear and is driven by said electric motor through said steering gear so as to steer said rear wheels.

4. A rear wheel steering apparatus as claimed in claim 1, wherein said high vehicle speeds are above 75 km/hr, said low vehicle speeds are below 10 km/hr, and said intermediate speeds are between 10 km/hr and 75 km/hr.

* * * * *